Oct. 18, 1955 J. T. VALE 2,721,288

FOCUSING GRID STRUCTURE FOR ELECTRON TUBES

Filed Oct. 23, 1951

INVENTOR.
JAMES T. VALE

BY Lippincott & Smith.
ATTORNEYS.

United States Patent Office 2,721,288

Patented Oct. 18, 1955

2,721,288

FOCUSING GRID STRUCTURE FOR ELECTRON TUBES

James T. Vale, Walnut Creek, Calif., assignor to Chromatic Television Laboratories, Inc., New York, N. Y., a corporation of California Application October 23, 1951, Serial No. 252,664

22 Claims. (Cl. 313—78)

This invention relates to cathode-ray tube apparatus for the direct display of polychrome television images upon the tube target.

Various proposals have been made for the recreation of television image signals transmitted according to all or any of a dot-sequential, segment-sequential, line-sequential or field-sequential pattern to provide polychrome television images when received and recreated. The tube with which this invention is concerned is applicable to the recreation of polychrome television images for direct observation, regardless of which of the several systems already proposed is utilized for the image pattern recreation.

Likewise, the tube of the character herein to be set forth and explained is equally applicable to apparatus used to receive signals transmitted according to presently-existing black-and-white standards of television, so that the developed image may be recreated as a black-and-white monochrome.

As is explained in the co-pending United States patent applications entitled "Direct-View Color Tube" and "Cathode Ray Focusing Apparatus," each filed by Ernest O. Lawrence on June 29, 1951, as Serial No. 234,190 (now U. S. Patent No. 2,711,493, granted June 21, 1955), and April 4, 1951, as Serial No. 219,213 (now U. S. Patent No. 2,692,532, granted October 26, 1954), respectively, to which applications reference is made particularly as to certain of the broader features of post acceleration and focusing, there is set forth a luminescent target within a cathode ray tube envelope in which the modulatable scanning cathode-ray beam so impacts a target area as to cause light in various colors to be emitted therefrom, depending particularly upon the angle of incidence of the scanning beam with respect to the target area. A tube of such characteristics so operates that there is both a focusing and an accelerating action produced upon the scanning ray beam in the area adjacent the plane of the target. Appropriate control is provided within the tube wherever the scanning beam is so positionally located relative to the tube target that at any instant the desired color representation is brought about.

The present invention is generally concerned with a similar type of tube to those above mentioned, but it is particularly concerned with features of the electron beam focusing and accelerating electrode structure, which may be in the form of a grid generally adjacent the tube target plane. By way of reference to the nature of the invention it may be assumed, as is set forth in the above-mentioned United States patents of Ernest O. Lawrence that the tube target area comprises a plurality of strips of phosphor coatings adapted to luminesce in different colors. These strips are parallelly and adjacently positioned with respect to each other and any group thereof. For instance, certain of the strips are adapted to luminesce to produce individually red, green and blue light. These colors are usually considered to be the additive primary or component colors of a tricolor system and additively produce white when properly balanced, as is well known. The strips may be considered collectively to have a width corresponding to one elemental area of an image of which the reproduction is desired. Generally speaking, the several strips are arranged in such fashion that, for instance, a series of three such strips, adapted to produce light in red, green, blue, collectively form one color cycle, in which case each of the strips may be assumed to be of a width generally equal to one-third of that of an image point in a picture or image to be recreated. The strip lengths may be substantially equal to the picture height and a sufficient number of strips positioned adjacent each other to provide, when scanned transverse to the strip length, a coated area providing the desired picture aspect ratio.

It is often desirable to form the phosphor coating strips on the target in such fashion that the strips to produce red and blue light are twice as wide as those to produce green light, although the number of green light producing strips is twice as great as any of the other types. Where this practice is followed, the sequence of phosphor strips may be assumed to comprise a so-called "single-width" strip adapted to produce green light, a so-called "double-width" strip adapted to produce red light, a "single-width" strip adapted to produce green light, and a "double-width" strip adapted to produce blue light, after which the sequence repeats again and again to fill the window and target area. A group of phosphor strips of this character has a width corresponding to that of two picture points or elemental areas of the image to be reproduced. However, it will be seen that phosphor strips to produce the same three colors of light, namely, red, green and blue, are present in each area of the target in which each point or elemental area of the recreated picture is to be represented. Under these circumstances, the color cycle from one point is in the order of red, green, blue, for instance, while the adjacent point is blue, green, red. This, however, is of no consequence from the standpoint of any possible color crawl, since the individual three colors are represented in areas which are of sub-elemental size and a portion of each wider strip may be considered as included in each successive color cycle. The significant factor is that for each elemental picture area or point there is a phosphor strip coating adapted to produce light in each of the three selected colors, assuming, of course, that for analysis purposes the picture point or elemental area is assumed to commence and end at an intermediate point on each of the wider phosphor strips.

It is also possible to provide a number of strips in which one color may predominate with respect to the other two, so that a color cycle, for instance, might be formed as the result of scanning four strips each one-quarter the width of one elemental area of the picture, with the strips being in a repeating sequence corresponding to red, green, blue, green, and then repeating. Also, if it is found desirable for any reason the areas scanned shall be equal the width of one (e. g. the duplicated) strip may be narrower than the others.

While it may be inferred from the foregoing that scanning of the target strips is transverse to the long dimension of the phosphor strips it nonetheless is to be emphasized that the invention is applicable to tubes wherein target area strips are scanned in a direction longitudinally thereof. The invention as such is directed to the general form of grid structure assembled with the strip-like target so that the mention above of methods of using the tube is purely by way of example to set forth the general nature of the invention.

As is mentioned in the above-identified patents of Ernest O. Lawrence, in the general region of the final target there is a focusing or control electrode by which the electron beam, after moving through the major portion of the cathode ray tube at a relatively low velocity is focused to arrive at the final target in a relatively small point while receiving additional acceleration in the region immediately adjacent the final tube target. The scanning cathode-ray beam thus impinges upon that target at a velocity very considerably higher than that at which it moves through the major portion of the tube. At the same time by establishment of a suitable ratio of potential on all of the final target, the accelerating and focusing grid and the point of scanning beam origin, it becomes possible to focus each point of the image separately by a multiplicity of individual electrical lenses arranged immediately adjacent the final screen or target. Accordingly, the color of light emitted as a result of the scanning cathode-ray beam impacting the target is controllable in accordance with the direction from which the scanning beam is directed toward the target and because the scanning beam is focused to a point in the target which is but a fraction of the size of an elemental picture point which would otherwise be resolved not only is color realizable but also greater definition results in the developed picture.

According to the inventions as heretofore explained, various proposals are presented for arranging the focusing grid structure in the region of the final tube target. In this sense the conducting strands forming the grid are arranged to extend lengthwise of the separate phosphor strips. They are also aligned symmetrically with one of the types of phosphor strips of the group. Because of the fact that the conducting strands present an extremely small area relative to the cross-sectional area of the scanning beam directed toward the target, it is found that only a very small portion of the electrons of the scanning cathode-ray beam are intercepted by this conducting strand. The result is that the majority of the electrons of the beam always reach the target to develop the luminous effects.

The formed grid structure thus functions in the nature of a lens grid, and also as a part of the accelerator mechanism. As a result of the spacing of the conducting strands and the potential effective thereupon as compared to that on each of the target and the source of the electron beam, all electrons of the beam entering between any pair of the conductors are brought to sharper focus with the width of the focused spot being considerably smaller than the spacing of the wire conductors. This sharp focus, furthermore, lies substantially on that phosphor strip which is midway between the color grid wires for conditions where the several grid wires all operate at like potential relative to the final tube target. In a tube of this variety, it is possible to alter the angle of incidence in accordance with the color of the image to be displayed. Because of the very small width of the focus spot in comparison with the width of the original scanning beam or the width of one picture element, the time of transition between the sub-area of one color and that of another may be so small as to cause negligible color dilution or contamination. If desired, it is, of course, possible to blank the beam during such transition periods, and in this event the blanking period may be made so short that the duty cycle of the tube as a whole may be made in the neighborhood of 90%. As a general proposition, however, blanking is not essential to the operation.

In using a grid structure of the character above set forth it is particularly important to prevent any vibration between the strung conductors. Even though the strung conductors are generally tensioned and held taut, there is occasionally some chance that even this is not sufficient to prevent string or strand vibration. Any vibration, of course, will operate against the tube efficiency and introduce both misfocusing and even incorrect color response in extreme cases. To this end, this invention provides ways and means for damping any vibration which might tend to be introduced. Included among the arrangements for achieving this objective is that of winding or passing vibration-damping cord or strand in and out between the various strung conductors in a region near the support. One suitable form of vibration-damping strand has been found to be in the form of a ceramic thread. Other equivalent forms of arrangements may be substituted where desired.

In accordance with the foregoing, one of the objects of this invention is to provide a focusing and accelerating grid structure which shall be more highly efficient, more easily assembled, and of greater general overall utility than those heretofore used.

Another object of the invention is that of providing a grid or electrode structure for the purposes outlined, which shall be substantially free of distortion in the shape or size of the image developed thereby.

A further object of the invention is to provide a grid structure which is usable as a focusing and accelerating element of a variety iin which relatively low power consumption would be necessitated, and yet there will be developed a high-intensity luminous spot on the target area.

Still a further object of this invention is to provide improved fidelity of operation through the provision of suitable means to preclude the possibility of grid structure vibration.

Other objects of the invention are to provide ways and means by which a grid structure of the type herein set forth may be fabricated in such a way that the grid wires are maintained in substantially precise parallelism and uniform spacing, and wherein the tautness of the wires is maintained as a more or less inherent function of the assembly.

Other objects of the invention are to provide a grid structure which may be readily manufactured externally of the tube into which it is to be used and assembled and aligned with the target structure in a way which will simplify bringing into parallelism the conducting elements of the grid and the phosphor coatings upon the target.

Various other objects and advantages of the invention, of course, will be made apparent, and even suggest themselves, to those skilled in the art to which the invention is directed, when the following specification and claims are considered in connection with the accompanying drawings, in which:

Figure 1:
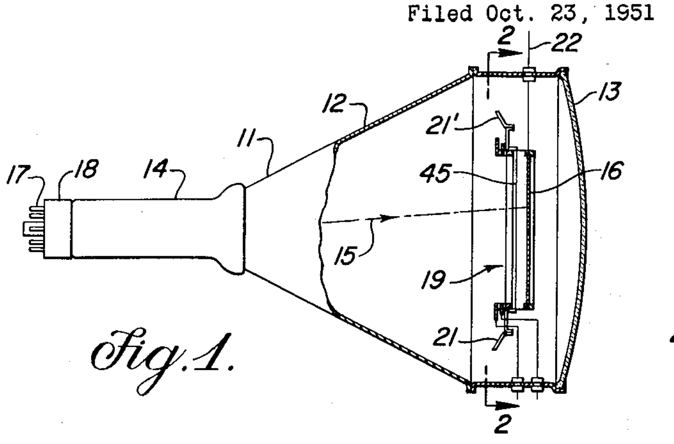
Fig. 1 represents schematically and partly in section an elevation of one form of cathode ray tube wherein the invention is utilized.

Referring now to the drawings for a further understanding of the invention and bearing in mind that the disclosures of the patents of Ernest O. Lawrence, Nos. 2,711,493 and 2,692,532, above identified, are to be regarded as generally incorporated herein for purposes of additional reference, the device of the present invention comprises a tube or evacuated envelope 11 having flaring frusto-conical or pyramidal wall envelope 12 and a viewing window 13 attached thereto. Toward the base of the tube or evacuated envelope there is a generally tubular neck portion 14, wherein there is mounted in any desired manner the electron gun structure (not shown) by which the issuing cathode ray beam 15 is developed for projection toward the target area conventionally represented at 16 within the tube. It is upon this target area, which will later be defined in further detail, that the electro-optical images are developed as a result of impact thereupon of relatively high velocity electrons of the scanning cathode-ray beam.

Within the generally tubular neck portion 14 of the tube suitable deflecting electrodes are provided (also not shown), as is disclosed in the above-mentioned patents granted to Ernest O. Lawrence, which electrodes may be used to provide the bi-directional deflection of the scanning beam 15 for the purposes of tracing a raster upon the tube target, and also for providing, as necessary, for a further control of the direction from which the impinging scanning cathode ray beam appears to be aimed toward the target. These features are completely explained in the aforesaid patents of Ernest O. Lawrence, and need not be further considered herein except as indirectly related to the overall structure to be defined. It is, of course, apparent that, if desired, suitable deflection yoke members may be provided externally of the tube in the region of the termination of the tube neck, and its mergence with the frusto-conical wall, whereby, as in known fashion, the scanning beam may be deflected.

Suitable control and operating voltages are applied to the tube and its electrode elements, particularly those of the gun, by way of suitable conductors 17, formed as a part of the tube base conventionally represented at 18.

As a scanning cathode-ray beam is projected through the tube, preferably it is moved between the electron gun (not shown) contained within the tube neck 14 and the focusing and accelerating grid member 19 at a relatively low velocity. Final acceleration of the beam is provided in the tube region intermediate the grid element 19, and the final target 16 through the application of suitable control voltages thereon. The voltage applied to the tube screen or target may be applied by virtue of a conducting coating, preferably of aluminum, thereon on the side toward the source of the scanning electron beam. Metallized coatings upon a tube target are well known in the art. They serve three important functions, one of which is to eliminate substantially the objectionable ion spot that would otherwise be present on the tube target, second, they serve as a reflecting element by which greater efficiency of the phosphor-coated screen may be attained by reason of outward reflectance of the developed light, rather than losses occasioned by reason of the fact that light would otherwise be directed inwardly of the tube itself, and not almost exclusively out through the viewing window; and third, they provide ways and means for applying voltages to the target area 16 relative to the grid structure 19. These voltages may be appropriately regulated to provide maximum focusing efficiencies, but, as a general rule, it has been found that satisfactory operation is attainable where the beam electrons from the electron gun to the grid are accelerated at a voltage of the order of 3000 to 4000, and derive their final impact velocity by a potential difference of the order of 12,000 to 14,000 volts applied between the grid structure 19 and the final target 16. This provides, then, a relative voltage difference of the order of three to four, or even more times, the initial accelerating voltage made effective in a limited tube length, as illustrated, in substantial proportion to the actual construction by the showing of Fig. 1.

Suitable conductors and outlets for applying the voltage to the grid and the final tube target may be provided by conductors such as those represented at 21 and 21', for instance, to supply the grid 19 and that represented at 22 to supply the tube target 16.

The tube wall, and particularly the frusto-conical portion, may be either metal or a suitable vitreous material evacuated to a degree necessary and consistent with satisfactory operation. The viewing window 13 is provided in the form of a transparent vitreous material through which the target 16 may be viewed. If desired, it is, of course, possible to provide the phosphor coatings directly upon the tube wall, rather than upon a separate target area 16, as herein represented. For ease of manufacture, however, it is often convenient to support a transparent screen or target surface, such as that represented at 16, from a part of the accelerating and focusing grid mounting 19, in that ease of alignment is maintained and simplification of the process of manufacturing is established. It is, nonetheless, purely a matter of choice, and therefore the present showing is to be regarded purely as illustrative.

In any event, the tube target is formed of a series of phosphor-coated strip areas, each of sub-picture element width, and each of a length extending completely across the target area. As shown, the phosphor coatings are applied in accordance with a repeating color cycle which may be, for instance, red, green, blue, red and so on. It is usually desirable to arrange the phosphor strips so that one strip of each group of colors is "centered" relative to the color control grid wires. This makes it particularly feasible to represent one color of light in each color cycle of primary colors by the scanning cathode ray beam upon which no supplementary deflection is introduced by the color control grid. For purposes of simplification of reference herein, a color cycle will be designated and assumed to be a group of three phosphor-coated strips, with the phosphor producing green light being centrally located, and the phosphors producing the red and the blue light flanking it on either side, it being understood, of course, that this arrangement is purely illustrative and in no sense limiting. The actual width of any individual phosphor strip should be such that the group of strips comprising one color cycle is of a width of the order of magnitude of one picture element.

Figure 2:
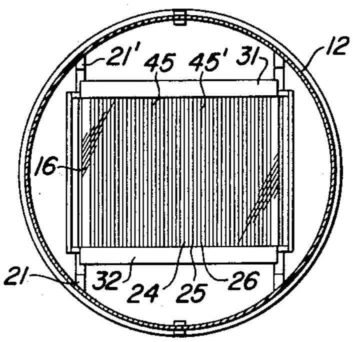
Fig. 2 is a front view of the tube of Fig. 1 to illustrate the relative alignment of the grid structure conductors and the phosphor strip coatings.

Accordingly, the width of any one strip is determined by the size of the tube and the viewing area encompassed within the viewing window. For a tube of the so-called 17" variety, which might be regarded as illustrative, the picture element width is almost 0.04". This represents the combined width in a tricolor system of three strips of one color cycle. To produce the color picture the diameter of the impinging cathode ray beam should be at least as small as the smallest strip width, but from the practical viewpoint it is desirable that the impinging beam be brought to a spot size which is considerably smaller than this size, in order to minimize the effects of color dilution as the beam passes from one to another of the different-character phosphors producing light in different colors, or in order that the blanking period provided (in case blanking is desirable) as the scanning beam moves from one to another different type of phosphor strip shall be reduced to a minimum. For the purposes of explanation herein, it is immaterial which form of operation be used. Suffice it to say, therefore, that as illustrated by Fig. 2, the target area shown at 16 may comprise phosphors of different characters, schematically represented by the areas 24, 25 and 26, which, collectively, may be assumed to be of a combined width equal to one picture point.

Obviously, for purposes of representation on the drawing, there is no proportionality whatsoever between this width and the overall width of the tube, and there is not intended to be any relationship between the number of strips schematically depicted and that number which would be present were the illustration to scale. For reference purposes, the phosphor strip producing red light may be assumed to be the strip 24, that producing green light the strip 25, and that producing blue light the strip 26, after which the same type phosphor repeats. In any discussion of the types of phosphor strips it is occasionally desirable to refer to these phosphor strips as the red, the green and the blue phosphor, although actually the color reference has nothing to do with the phosphor itself. The phosphor coating is usually in the form of a relatively white powder. However, the color reference has found some favor in the art as designating the color of light adapted to be developed by the phosphor under beam impact.

Figure 3:
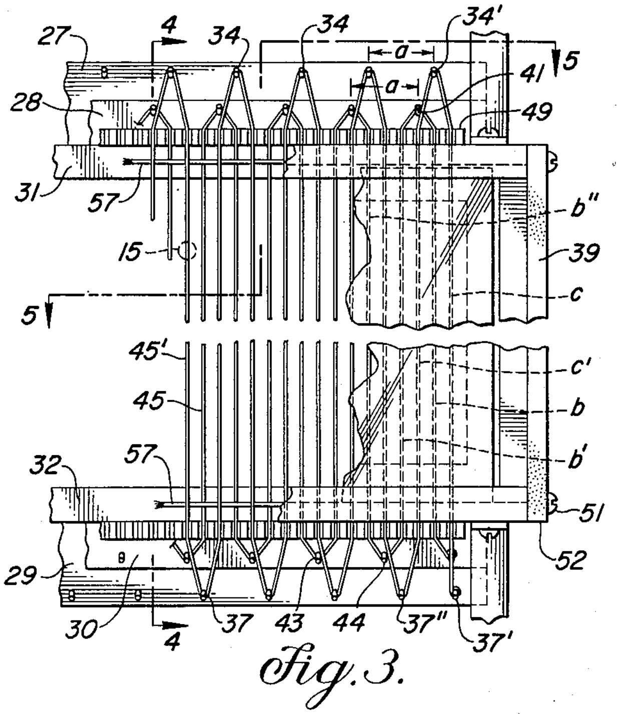
Fig. 3 is an elevation view to represent the manner of supporting the conducting grid elements relative to the carrying frame.

Referring now to Fig. 3 of the drawings, there is shown a grid structure adapted for arrangement intermediate the electron beam developing electron gun (not shown) and the tube target 16. As is explained particularly in the U. S. Patent granted to Ernest O. Lawrence, No. 2,711,493 above mentioned, a grid of this nature comprises a plurality of conducting strands or wires arranged in such a manner that one conducting strand is opposite one group of phosphor strips necessary to produce light in each color of the color cycle selected. Conducting strands or wires of this nature may be of almost any good conducting material but among the more suitable are stainless steel and nickel.

The scanning electron beam as it strikes the target has first passed through the grid structure 19 and the developed electron beam 15 has been subjected to the accelerating field introduced between the tube target 16 and the grid 19, and has been focused as a result of the lens effect brought about between each conducting strand and the final target. If the target is formed of a series of strips of phosphors, and if conductors are strung parallel to these phosphor strips in a number corresponding to the number of color cycles of strips on the target, there will be a number of electron lenses corresponding substantially to the number of picture points in any one line of a picture formed in the area immediately adjacent the tube target. It is with this type of grid structure that the present invention is particularly concerned, and, accordingly, therefore, reference herein made will be principally to this type of construction.

In its essence, the grid 19 may be considered to be strung between support beam members designated 27 and 28. These beam members are located approximately along one edge of the raster. Similar support beams 29 and 30 are located generally at the other edge of the raster. While the beams 27 and 28 are shown as two separate conducing members insulatingly supported relative to each other they might in some instances be regarded as a single element, as would be the case with the beams 29 and 30. In the latter case, however, they would be insulating material and provided with a pair of spaced conducting strips (not shown) for reasons later to become apparent. For purposes of illustration, and by reason of features later to be explained herein, it has been considered preferable in this instance to show the beams as separate components, although, as a matter of operating principle, it becomes quite immaterial as to the precise method by which this portion of the construction is set forth.

These beams may be carried from a main supporting beam 31 at the upper portion, for instance, of the grid framework. A similar member 32 is arranged to hold the lower portion. All of the beam members 27, 28 and 31 may be secured together and assembled as a unit, except that the members 27 and 28 are insulated from the frame and each other for utilization purposes by insulators such as 31'. The same is true with respect to the beams 29, 30 and 32. Where the separate members are joined, suitable fastening elements, such as the screws 33, provide adequate means of securement of the combination of the insulation and beams.

Figure 4:
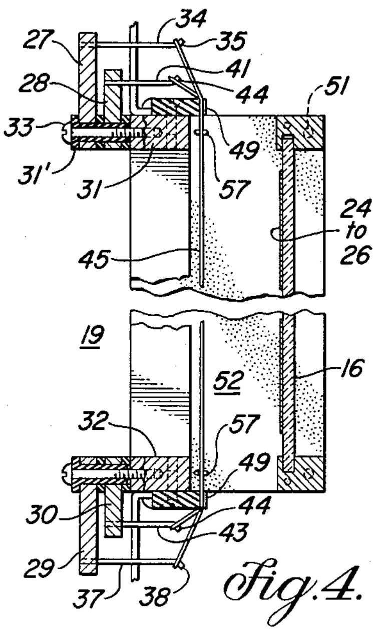
Fig. 4 is a sectional end view taken transversely of the structure of Fig. 3.

Along the beam 27 there is a plurality of cantilever elements or arms 34, which protrude outwardly therefrom. These arms have, generally the free end of the arm portion, an upwardly-turned hook section 35 (see particularly Figs. 4 and 6) or similar member. There is a similar arrangement of cantilever arms 37 extending outwardly from the lower supporting beam 29. Similar fastening hooks 38 are arranged on the cantilever arms 37 to face in the opposite direction from the hooks 35.

The cantilever arms 34, as well as 37, are all uniformly spaced laterally one with respect to the other. In the illustration herein provided the spacing *a* between the arms 34, as well as the arms 37, is illustratively represented as being four times the width of the strips forming any one color cycle. The support beams 27 and 29 upon which the cantilever arms 34 and 37 are supported are spaced one from the other by suitable spacer members 39, which are preferably attached to one of the support beams, such as that shown at 31. According to the usual and preferred construction the length (height) of the spacer member 39, of which there is one at either end of the support beams 31 and 32, is at least that corresponding to the length of the individual phosphor strips. Thus, the spacers 39 are of a length corresponding to that of one dimension of the image to be recreated. By this arrangement the cantiliver elements fastened to the support beams are spaced outwardly from the image area and maintained in this relationship so that, within the confines of the innermost support beams, such as 31 and 32, and the spacer members 39, a window area is formed which is of generally like size to that of the image area observable through the viewing window of the tube.

On the inner support beams 28 and 30 a plurality of additional cantilever arms 41, which are also uniformly spaced one from the other laterally, are adapted to be supported. The cantilever arms 41 and 43 are generally shorter than the cantilever arms 34 and 37, and are secured closer toward the boundary of the viewing window. They are all aligned one with another, as are the adjacent cantilever arms and the spacing of one from another corresponds to that given to the longer cantilever arms 34 and 37. As illustrated, the support beams 28 and 30 for carrying the shorter length cantilever arms 41 and 43 are shown separate from the support beams to carry the longer cantilever arms 34 and 37.

As was pointed out with respect to the longer cantilever arms 34 and 37, an appropriate fastening hook is provided at the outer end of the arm for the purpose of securing or positioning a conductor element, later to be explained, which is strung between the various cantilevers. For the purpose of illustrating the cantilever spacing, the various arms have been indicated on Fig. 3 as separate from each other by a distance *a*. This distance represents, according to a preferred construction, four times the width of all phosphor coating strips making up one complete color cycle, or, stated differently, it represents a width corresponding to four elemental elements of a picture image to be created upon the tube target. A like separation is provided for the cantilever arms of both longer and shorter length. The cantilever arms secured to the upper beam supports 27 and 28 are located in such a way as to be opposite the midpoint between like-length cantilever arms secured to the lower supporting beams 29 and 30. The reverse condition occurs with respect to the positioning of the cantilever arms 37 and 43 relative to the arms 34 and 41.

It will also be observed from a consideration of Fig. 3 that the cantilever arms 41 are spaced laterally from the closest cantilever arms 34 by a distance which is equal to one-quarter the separation of either the long cantilever arms with respect to each other or the short cantilever arms with respect to each other. This corresponds to a separation or lateral displacement of shorter cantilever arms relative to the longer cantilever arms by a distance equal to the strip widths of one color cycle, or one picture element. The separation of the next succeeding long cantilever arm, looking from right to left, is equal to $3a/4$, inasmuch as the cantilever arms supported upon the lower beam occupy the intervening spaces.

Between the cantilever arms 41 and 43, as well as between the cantilever arms 34 and 37, suitable conducting strands or wire sets 45 and 45', respectively, are arranged to be strung. As the arrangement is shown, it is usually preferable to string the wires first about the shorter-length cantilever arms. To this end, it may be assumed that the end of the wire 45 is first fastened securely to the hook-like end 44, illustratively, of the cantilever arm 43 furthest to the right looking at Fig. 3. The wire then is caused to follow upwardly along a path designated $b$ to loop over the end of the cantilever arm 41 furthest to the right on the support strip 28, as shown in Fig. 3. Next, the wire is looped downwardly to follow along a path designated at $b'$ until it reaches the cantilever arm 44 next to the left of that from which it was started, after which the path reverses and follows that designated schematically at $b''$. This back-and-forth attachment of the wire to the ends of the cantilever arms 44 and 41 continues until the wire or conducting strand extends over all cantilever elements from right to left, illustratively. At the opposite end of the sequence it is again fastened and secured, for instance, to the conductor 21.

Similarly, a conducting strand or wire 45' of similar nature is caused to be wrapped between the longer cantilever arms 37 and 34, respectively. This last-named conductor may start at the lowermost cantilever arm 37' and follow a path designated $c$ and loop about the cantilever arm 34', after which the wire is looped back along the path $c'$ to wrap around the next cantilever arm 37''. The complete manner of securement is apparent from what has been stated with respect to the fastening of the conductors to the shorter-length cantilever arms.

At the left edge of the frame the conductor 45' may be secured to the outlet conductor 21' for the application of suitable operating voltages.

The cantilever arms 34, 37, 41 and 43 are preferably formed from rather stiff wire which has some resiliency and yet which tends to be more or less rigid to the influence of the very thin and small-diameter conductors 45 and 45'. Under the circumstances stiff wire of the character known as piano wire is quite suitable for the cantilever arms. As is above suggested, the conducting strands 45 and 45' may be of extremely fine wire (such as nickel or stainless steel, for instance) of only a few mils' diameter, and in fact the wire size may be as small as two or three mils, which is a form of commercially-available wire.

Figure 5:
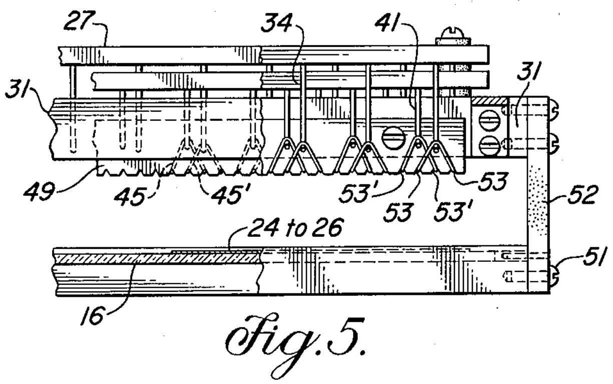
Fig. 5 is a plan view of the gird structure shown by Figs. 3 and 4.

In order that the wire strands strung back and forth between the cantilever arms shall be caused to lie in planes which are generally parallel to the edge of each phosphor-coated strip of the target, there is included in the assembly a suitable spacing element, usually in the form of a positioning element 49, which may be of an insulating type such as that known by the trade name and style of "Mycalex." The positioning or spacing element 49 is suitably supported generally adjacent the beams 27 and 28, holding the cantilever arms 34 and 41, as well as adjacent the beams 29 and 30, holding the cantilever arms 37 and 43. As is more particularly shown by Figs. 5 and 6, it will be seen to have appropriate notches 53 cut into the outer edge thereof. These notches are generally of a V-shape, so as to provide a recess into which the conducting strands may be placed. The straight edge of the V extends in a direction which parallels the edge of the phosphor-coated strips, so that when the wires 45 and 45' are strung back and forth between the cantilever elements to follow the paths designated $b$, $b'$, $b''$ and so on, as well as $c$, $c'$ and so on, these paths may be seen to be parallel one with the other and aligned with respect to the phosphor coating.

Alignment of the coating strips with respect to the grid wires may be accomplished in any suitable manner. To this end, the complete grid frame 19 may be adjusted slightly relative to the screen or target 16 in the assembly. This is conventionally represented in Fig. 4, where the target strips 24 to 26 are indicated as being positioned in alignment with the conductors 45. Likewise, from the arrangement of Fig. 5 it will be apparent that the coatings on the target plate 16 may be aligned relative to the conducting strands 45 by adjustment of the screws 51 held within the support frame 52 extending outwardly from the support base members 31. To prevent any relative angular change of these elements, slight adjustments of the screws 51 will change the angular position of the coatings relative to the conducting strands.

When the conducting strands 45 and 45' are strung back and forth between the cantilever arms, they are positioned in the V notches 53 and there held securely. This would be adequate were it not for the desire in most instances where there is to be extremely high fidelity operation to guard against the effects of vibration on the tube.

Figure 6:
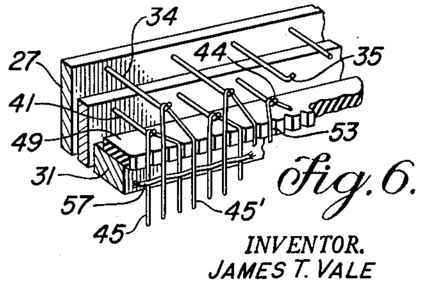
Fig. 6 is a perspective, partly in section, of the grid support structure of Fig. 3 taken generally along the line indicated 6—6.

It was suggested hereinbefore that for high fidelity operation provision should be made to safeguard the developed tubes and grid structure from the effects of vibration. Unless the conducting strands strung back and forth between the ends of the cantilever elements can be damped against vibration it will be apparent that detrimental effects both to the focusing and to the color tracking may be introduced by reason of the possible change in the relative position of conductors 45 and 45' and the phosphor-coated target area. To preclude a possibility of such vibration it is desirable in the assembly of the grid structure and the winding of the conducting strands or wires about the ends of the cantilever arms to place a vibration damping strand or string over the conductors 45, after they have been wrapped back and forth between the ends of opposite cantilever arms. Such a strand is preferably of some vitreous, ceramic or other insulating material. It may even be a glass thread, such as represented at 57. As this strand is shown it is usually fastened at one end to the frame and caused to overlay the conductor 45 attached to the shorter-length cantilever arms, generally in the region of the support beams 31 and 32. Then, when the conducting strand or wire 45' is wrapped, or wrapped between the free ends of the longer ends of the cantilever arms 34 and 37, this strand 57 will lie beneath the last-wrapped conductor. In this way the vibration damping strand, as is clearly apparent, particularly in Fig. 6, is caused to weave in and out between the two sets of conducting strands 45 and 45' forming the grid wires, and by drawing this strand tight as the grid is finally assembled, it will be appreciated that this serves a most important function of precluding any vibration. At the same time, because of the insulating properties of the vibration-damping strand 57 there is no electrical connection provided between it and the two sets of conductors.

For convenience of mounting and support, it is apparent that a more difficult assembly and fabrication job would be provided if the cantilever arms 34 had to be spaced too closely to one another. It is for reasons such as the foregoing, that the shorter length cantilever arms, such as 41, as is above explained, are located intermediate the longer arms 34 and 37, for instance, and arranged to extend inwardly from the viewing window in like directions. The conductors strung between both the shorter-length and the longer-length cantilever arms for two separate wire sets which should extend along paths parallel to each other. Both sets of conductors are strung sufficiently tightly over the free ends of the cantilever to bend the cantilever arms very slightly. The cantilevers thus apply tension continually to the strung conductors. The hooks or upturned ends, such as 35, are sufficient to prevent disengagement from the cantilever arms of the strung conductors. Both sets of conductors are arranged to fit within the V notches 53' in the positioning or spacing element 49.

It will thus be appreciated from what is set forth herein that each notch in the positioning element 19 is located at a spacing from each adjacent notch by a distance which is substantially a precise measure of the width of any one set of coated phosphor strips to produce light corresponding to the light of a single color cycle. Accordingly, these notches correspond in separation to approximately the width of one picture element in the finally-recreated image. While the showing in the drawings is purely illustrative, and not in any way to scale, nonetheless it does suffice to show the general relationship of the various components.

Separation between the wires strung from the shorter- and longer-length cantilever arms is provided by reason of the different angle maintained between the wires strung from the outer or longer cantilever arms, with respect to the wires strung from the inner or shorter cantilever arms. It is particularly evident from the showings of Figs. 4 and 6 that the angle made between the wire strung to the longer-length cantilever arm is less of a departure from a continuation of it as far as its direction of extent between the supports 49 is concerned than is the case with the wires strung about the shorter cantilever arms.

Suitable arrangements for effecting an application of control voltages to the grid structure are provided by way of the conducting elements 21 and 21′ which, in the illustrated example, may be considered to connect to one end of the conductors 45 and 45′.

From what is explained and shown it is believed to be clear that various modifications may be made. Illustratively, if desired, a greater number of different length cantilever arms may be uniformly spaced with respect to each other and to the remaining groups as a whole.

Various other forms of locating elements may be utilized to provide the function of insulating strip 49 with its V-shaped notches. The arrangement herein depicted has, however, proved to be satisfactory for commercialization and rapidity of assembly in that the assembly as a whole may be provided by winding the wires while the cantilever support beams are held tightly in a jig, and the wires are stretched and strung between opposite cantilevers in a series.

Also, where it is feasible from manufacturing standpoints, all cantilever arms may be of like length, the critical factor being that at which it is most easily possible to string the wires in commercial production.

In the foregoing considerations it has been set forth that the parallelly strung color control grid wires are spaced to correspond to the width of any group of phosphor strips corresponding to one color cycle or corresponding to one dimension of a picture point or elemental area. This reference was particularly for ease of description. In the finally-produced tube it will be appreciated that the color control grid wire spacing is actually normally slightly less than the set-forth width of phosphor strips, due to the fact that the color control grid is positioned closer to the electron beam source and gun than the final phosphor target. The color control grid is actually so close to the target that the spacing is almost equal to the described width of phosphor strips, but, in practice, the wire spacing may be regarded as being generally equal to that fraction of the width of the phosphor strips for each color cycle which is represented by the ratio of the distance of the color control grid from the virtual electron source to the distance of the target from the same virtual electron source.

Thus, within the meaning of what has herein been set forth and as the invention will be defined in the claims, any reference to identity of grid wire spacing and phosphor strip width for one color cycle or even the substantial equality thereof shall be understood to include at least that degree of tolerance herein stated.

Having now described the invention, what is claimed is:

1. A grid structure for cathode-ray tubes comprising a support frame having a pair of support means and a pair of spacers located generally at the end ends of the beams to space them apart and form a window area within the boundaries of the beams and spacers, a plurality of resilient cantilever arms secured to each of the beams and extending outwardly thereform in like directions, a spacing bar secured generally adjacent to each support beam and its cantilever arms and facing the opposite beam and cantilever arms, the cantilever arms attached to each beam being similar and each comprising a plurality of sets of arms with the arms of each set uniformly spaced laterally from each other and the arms of each set being of like length from the support beams to the free end and each set having a different free arm length, the said spacing bar having substantially uniformly spaced guide elements substantially of a number equal to twice the number of cantilever arms, the said guide elements all terminating in a plane removed from the support beam which is at least equal to the lever arm length between the beam and the longest cantilever, means to position the cantilever arms secured to opposite support beams in such locations that cantilevers of generally like length are supported generally mid-way those secured to the opposite beam, a conductor strung tautly between the free ends of each of the like length cantilever arms and located by the guide elements of the spacing bar so as to form a plurality of substantially parallel conductor strands between the cantilever arms and terminal means to connect the conducting strands to an external circuit.

2. The grid structure claimed in claim 1 wherein the cantilever arms are in sets of two.

3. The grid structure claimed in claim 2 wherein the set of shorter cantilever arms is supported closer to the spacing bar than the set of longer cantilever arms.

4. The grid structure claimed in claim 3 wherein the conductor strung back-and-forth between the shorter length cantilever arms forms an angle between the free end of the cantilever and the spacing bar which is different from that angle which the conductor strung between the free ends of the longer cantilever arms forms with the same spacing bar.

5. The grid structure claimed in claim 4 where the conductors strung between the sets of shorter length cantilevers alternate in contact positioning in the spacing bar with those conductors which are strung between the longer cantilevers.

6. The grid structure claimed in claim 5 wherein all conductors strung between the spacing bars are substantially uniformly separated laterally.

7. The grid structure claimed in claim 6 wherein all conductors are arranged in substantially coplanar manner.

8. The grid structure claimed in claim 7 wherein the spacer member is non-conducting.

9. The grid structure claimed in claim 8 wherein the spacing bar is notched and each back-and-forth strung conductor is fitted within the notch for locating and positioning.

10. A grid structure for a cathode-ray tube comprising a support frame having a pair of support beams, means to space the beams apart from each other to form a window area within the boundaries of the beams and spacing means, a plurality of cantilever elements secured to each of the beams and extending outwardly therefrom, conducting strands strung back-and-forth between the cantilever elements carried by each beam and those cantilever elements carried by the opposite beam to form a plurality of conductors within the frame area, conductor positioning means supported generally adjacent the cantilever elements and the edges of the window area for locating the back-and-forth strung conducting strands and bringing the said strands into substantially precise parallelism and uniform spacing relative to each adjacent strand, a non-conducting strand laced in-and-out relative to each conducting strand and located approximately adjacent the conductor positioning means, and means to establish an electrical connection all of the conducting strands.

11. A grid structure for cathode-ray tubes comprising a pair of support beams and means to separate the beams to provide a window area within the boundaries of the beams and the separator means, cantilever elements extending outwardly from each of the beams, conducting strands strung back-and-forth across the window area and supported at opposite sides of the window area approximately at the free end of the cantilever elements, means supported in the general region of each cantilever element for aligning the back-and-forth strung strand to substantial parallelism and uniform spacing relative to each other, an insulating cord laced in-and-out between the back-and-forth strung conducting strands at regions approximately adjacent to the aligning means to provide for damping vibration of the strands, and means to connect the conducting strands to an external circuit.

12. In a cathode-ray tube structure wherein an electron beam is developed and adapted to be caused to scan a phosphor coated target area within the tube to trace a raster thereon, the combination of a grid wire support frame anchored by the tube wall and located to support a grid structure within the tube adjacent to the target with the frame external to the path of the cahode-ray beam tracing the raster on the target, a plurality of substantially uniformly separated grid wires parallelly and tautly supported substantially adjacent to the target area from the support frame from loci essentially external to the raster area to be traced, a plurality of non-conducting wire-contacting elements arranged at spaced intervals and extending transversely to the grid wire lengths, said wire-contacting elements being arranged to bridge each grid wire and substantially hold each wire against lateral movement and vibration, and means to establish electrical connection of all of the grid wires.

13. In a cathode-ray tube structure wherein an electron beam is developed and adapted to be caused to scan a phosphor coated target area within the tube along two paths substantially perpendicular to each other to trace a bidimensional raster thereon, the combination of a grid wire support frame anchored by the tube wall and located to support a grid structure within the tube adjacent to the target with the frame external to the path of the cathode-ray beam tracing the raster on the target, a plurality of parallelly supported and substantially uniformly separated grid wires tautly supported from the support frame from loci essentially external to the raster area to be traced, said grid wires extending substantially parallel to each other and located adjacent to the target and between the beam origin and the target, a plurality of non-conducting wire-contacting elements arranged at spaced intervals and extending transversely to the grid wire lengths, said wire-connecting elements being arranged to bridge each grid wire and substantially secure each wire against lateral movement and vibration, and means to establish electrical connection of all of the wires.

14. In a cathode-ray tube structure wherein an electron beam is developed and adapted to be caused to scan a phosphor coated target area within the tube along two paths substantially perpendicular to each other to trace a bidimensional raster thereon, the combination of a grid wire support frame anchored by the tube wall and located to support a grid structure within the tube adjacent to the target with the frame external to the path of the cathode-ray beam tracing the raster on the target, a plurality of substantially uniformly separated grid wires parallelly and tauty supported from the support frame from loci essentially external to the raster area to be traced, said grid wires extending substantially parallel to one of the mutually perpendicular scanning paths and adjacent to the target, a plurality of non-conducting wire-contacting elements arranged at spaced intervals and extending transversely to the grid wire length, said wire-contacting elements being arranged to bridge each grid wire and substantially anchor each wire against lateral movement and vibration, and means to establish electrical connection of all of the wires.

15. In a cathode-ray tube structure wherein an electron beam is developed and adapted to be caused to scan a target area within the tube to trace a raster thereon, and wherein the target area embodies a repeating sequence of elongated phosphor-coated strips adapted to become luminescent upon impact of the electron beam thereon, and wherein the individual strips have one dimension of a width of sub-elemental size as compared to any point of the image adapted to be developed on the target by the impacting electron beam, the combination of a grid wire support frame anchored by the tube wall and located to support a grid structure within the tube adjacent to the target with the frame external to the path of the cathode-ray beam tracing the raster on the target, a plurality of parallelly supported and uniformly separated grid wires tautly supported substantially adjacent to the target area from the support frame from loci essentially external to the raster area to be traced, said grid wires extending parallel also to be phosphor-coated strips, a plurality of non-conducting wire-contacting elements arranged at spaced intervals and extending transversely to the grid wire lengths, said wire-contacting elements being in a bridging relationship to each grid wire such that each grid wire is substantially anchored thereby against lateral movement and vibration, and means to establish electrical connection of all of the grid wires.

16. In a cathode-ray tube structure wherein an electron beam is developed and adapted to be caused to scan a target area within the tube to trace a raster thereon, and wherein the target area embodies a repeating sequence of different characteristic elongated phosphor-coated strips adapted to become luminescent upon impact of the electron beam thereon to produce individually light observable in one component color of an additive color process and wherein the individual strips each have one dimension of a width of sub-elemental size as compared to any point of the image adapted to be developed on the target by the impacting electron beam, the combination of a grid wire support frame anchored by the tube wall and located to support a grid structure within the tube adjacent to the target with the frame external to the path of the cathode-ray beam tracing the raster on the target, a plurality of parallely supported and uniformly separated grid wires tautly supported substantially adjacent to the target area from the support frame from loci essentially external to the raster area to be traced, said grid wires extending parallel also to the phosphor-coated strips and spaced relatively thereto a plurality of non-conducting wire-contacting elements arranged at spaced intervals and extending transversely to the grid wire length, said wire-contacting elements being arranged to bridge each grid wire and substantially anchor each grid wire against lateral movement and vibration, and means to establish electrical connection of all of the wires.

17. In a cathode-ray tube structure wherein an electron beam is developed and adapted to be caused to scan a phosphor coated target area within the tube to trace a raster upon the target area, the combination of a grid wire support frame anchored by the tube wall and located to support a grid structure within the tube adjacent to the target with the frame external to the path of the cathode-ray beam tracing the raster on the target, a plurality of parallelly stretched and substantially uniformly separated grid wires supported from the support frame from loci external to the raster area to be traced and held in a substantially common plane relative to the target area and between the region of the beam origin and the target, an electrically non-conducting wire-contacting element woven in and out relative to the grid wires to bridge adjacent wires from opposite sides and to extend transversely to the grid wire lengths substantially to hold each wire against movement and vibration, and means to establish electrical connection to all of the wires.

18. In a cathode-ray tube structure wherein an electron beam is developed and adapted to be caused to scan a phosphor coated target area within the tube to trace a raster thereon, the combination of a grid wire support frame anchored by the tube wall and located to support a grid structure within the tube adjacent to the target with the frame external to the path of the cathode-ray beam tracing the raster on the target, a plurality of substantially uniformly separated grid wires parallelly and tautly supported substantially adjacent to the target area from the support frame from loci external to the raster area to be traced, a plurality of non-conducting wire-contacting elements arranged at spaced intervals and extending transversely to the grid wire lengths and woven so that alternate grid wires are on the same side of the wire-contacting elements substantially to prevent wire vibration, and means to establish electrical connection to all of the said grid wires.

19. In a cathode-ray tube structure wherein an electron beam is developed and adapted to be caused to scan a phosphor coated target area to trace a bi-dimensional raster thereon, the combination of a grid wire support frame anchored by the tube wall and located to support a grid structure within the tube adjacent to the target with the frame external to the path of the cathode-ray beam tracing the raster on the target, a plurality of substantially uniformly separated grid wires tautly supported from the support frame from loci external to the raster area to be traced, said grid wires extending substantially parallel to each other and located adjacent to the target and between the region of beam origin and the target, a plurality of insulating wire-contacting elements arranged at spaced intervals between the wire anchor points and held by the wires to extend transversely to the grid wire lengths, said wire-contacting elements being arranged to bridge each grid wire with adjacent wires being bridged from opposite sides so that each wire is damped and maintained in a substantially vibration-free state, and means to establish electrical connection to all of the wires.

20. In a cathode-ray tube structure wherein an electron beam is developed and adapted to be caused to scan a phosphor coated target area within the tube to trace a raster thereon, the combination of a grid wire support frame anchored by the tube wall and located to support a grid structure within the tube adjacent to the target with the frame external to the path of the cathode-ray beam tracing the raster on the target, a plurality of generally parallelly positioned and substantially uniformly separated linear conductors tautly supported substantially adjacent to the target area from the support frame from loci external to the raster area to be traced, a plurality of non-conducting elements positioned at spaced intervals and extending in and out relative to the linear conductors to bridge the conductors and place the conductors at either side of the non-conducting elements in sets each maintained by the non-conducting means substantially free from vibration relative to each other and to the target area, and means to establish electrical connection to the linear conductors.

21. In a cathode-ray tube structure wherein an electron beam is developed and adapted to be caused to scan a phosphor coated target area within the tube to trace a raster thereon, the combination of a grid wire support frame anchored by the tube wall and located to support a grid structure within the tube adjacent to the target with the frame external to the path of the cathode-ray beam tracing the raster on the target, a plurality of parallelly positioned and substantially uniformly separated linear conductors tautly supported substantially adjacent to the target area from the support frame from loci external to the raster area to be traced, non-conducting strand means extending in and out relative to the linear conductors to bridge the conductors and place the conductors at either side of the non-conducting means in sets each maintained by the non-conducting means substantially free from vibration relative to each other and to the target area, and means to establish electrical connection to the linear conductors.

22. A vibration damped grid structure serving as one component of an electron lens system for controlling the production on a target area of a cathode-ray tube of images visible in a plurality of colors collectively simulating substantially natural color comprising a grid conductor anchoring frame centrally open and adapted for positioning adjacent to the tube target and fixedly located relative thereto by the tube wall, the central opening of the frame when so supported permitting cathode rays to pass unobstructed through the opening to the tube target area to trace a raster thereon, a plurality of parallely-positioned, tautly-stretched and substantially uniformly separated linear grid conductors spanning the frame opening and secured at their ends to opposite sides of the frame, electrically non-conducting grid conductor-contacting means extending in-and-out and transversely relative to the grid conductors to place selected linear conductors of the grid at opposite sides of the non-conducting means in sets each maintained by the non-conducting means substantially free from vibration relative to each other and to the target area, and means to establish electrical connection to the linear conductors.

References Cited in the file of this patent

UNITED STATES PATENTS

| | | |
|---|---|---|
| 1,934,097 | Simon | Nov. 7, 1933 |
| 2,026,725 | Baker | Jan. 7, 1936 |
| 2,064,169 | Kershaw | Dec. 15, 1936 |
| 2,067,529 | Heising | Jan. 12, 1937 |
| 2,072,638 | Jobst | Mar. 2, 1937 |
| 2,416,056 | Kallmann | Feb. 18, 1947 |
| 2,444,740 | Jonkers | July 6, 1948 |
| 2,255,906 | Umbreit | Aug. 10, 1948 |
| 2,446,791 | Schroeder | Aug. 10, 1948 |
| 2,458,652 | Sears | Jan. 11, 1949 |
| 2,566,713 | Zworykin | Sept. 4, 1951 |
| 2,568,448 | Hansen | Sept. 18, 1951 |
| 2,577,368 | Schultz et al. | Dec. 4, 1951 |
| 2,653,263 | Lawrence | Sept. 22, 1953 |
| 2,683,833 | Zaphiropoulos | July 13, 1954 |